No. 784,372. PATENTED MAR. 7, 1905.
W. H. ALBEE.
HOSE COUPLING.
APPLICATION FILED SEPT. 8, 1904.
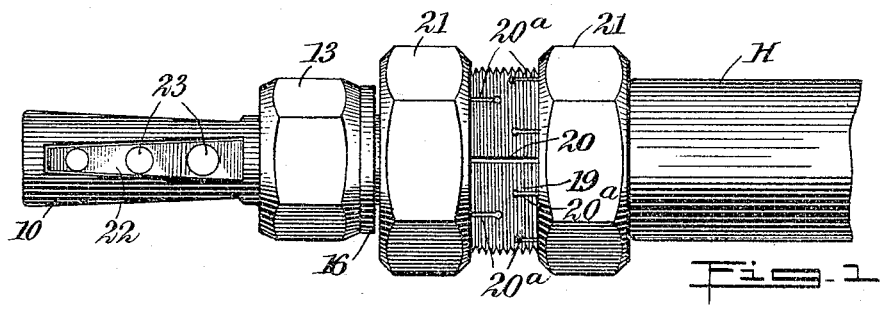
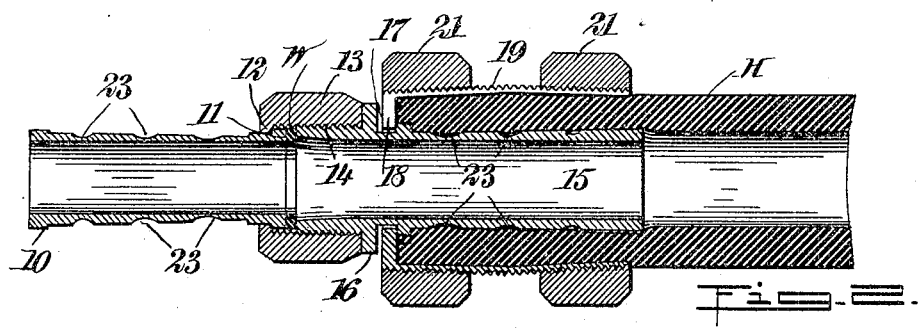
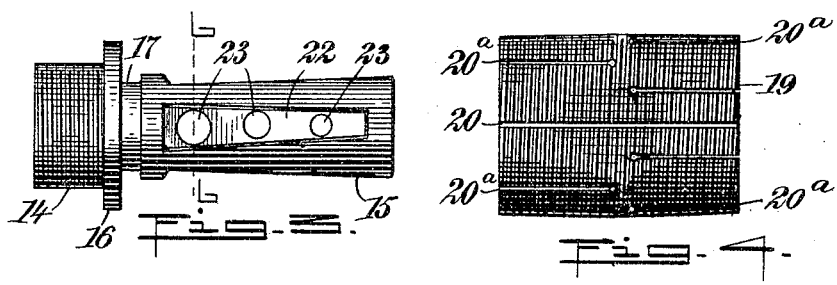
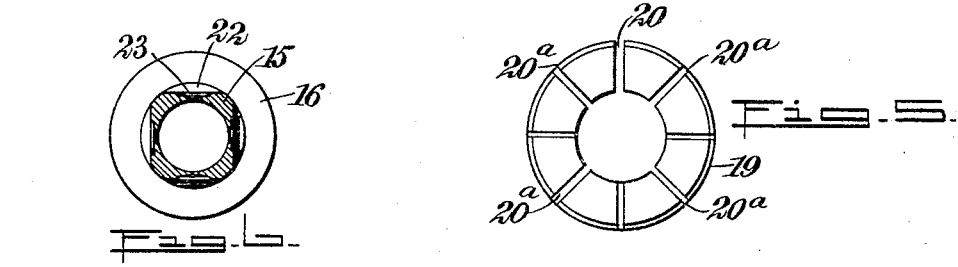
WITNESSES:
C. A. Jarvis.
S. H. Cobb.
INVENTOR
William H. Albee
BY
*Munn*
ATTORNEYS No. 784,372.

Patented March 7, 1905.

UNITED STATES PATENT OFFICE.

WILLIAM H. ALBEE, OF NEW YORK, N. Y.

HOSE-COUPLING.

SPECIFICATION forming part of Letters Patent No. 784,372, dated March 7, 1905.

Application filed September 8, 1904. Serial No. 223,678.

*To all whom it may concern:*

Be it known that I, WILLIAM H. ALBEE, a citizen of the United States, and a resident of the city of New York, borough of Manhattan, in the county and State of New York, have invented a new and Improved Hose-Coupling, of which the following is a full, clear, and exact description.

My invention relates to hose-couplings, and has for its principal objects the provision of a secure and readily-operated device which will be effective to lock both the exterior and interior of the hose against disengagement.

It consists in the various features and combinations hereinafter described and more particularly claimed.

Reference is to be had to the accompanying drawings, forming a part of this specification, in which similar characters of reference indicate corresponding parts in all the views.

Figure 1 is a side elevation of one embodiment of my invention. Fig. 2 is a central vertical longitudinal section therethrough. Fig. 3 is a side elevation of one of the coupling members. Fig. 4 shows the compressible sleeve in side elevation. Fig. 5 is an end elevation of said sleeve, and Fig. 6 is a transverse section on the line 6 6 of Fig. 3.

10 designates a coupling member having at one end an annular flange 11, which coacts with a flange 12 upon a coupling-nut 13. This nut engages a thread at 14 upon a second coupling member 15, it extending to a flange 16 encircling the same, this nut serving to draw the coupling members together in the usual manner, there preferably being interposed between their ends a suitable washer W. Beyond the flange is shown a depression 17, which is preferably continuous and annular and which receives a projection in the form of an annular flange 18, extending inwardly from the extremity of a sleeve 19, which is separated from the coupling member 15 sufficiently to furnish a space to receive the hose H. This sleeve is divided longitudinally at 20, thus enabling its flange to be sprung into the depression, and is compressible, it being provided at its ends with slots 20ª, extending from points near the center in opposite directions and alternating with one another. The sleeve is threaded upon its exterior to receive nuts or collars 21, having their inner engaging faces inclined or converging outwardly. Both the coupling members have hose-receiving depressions 22 of trapezoidal form, their inclined sides converging toward the outer ends of the members. There may be further provided separated depressions 23, conveniently circular in form, opening from the bottoms of the depressions 22, there being three of the former for each of the latter.

In use the end of the hose is introduced between the coupling member and the divided sleeve and the nuts 21 turned toward one another. This compresses the ends of the sleeve, forcing the hose into both the trapezoidal and circular recesses. As a result said hose will be locked upon the coupling member by the engagement of its inner and outer faces, the former extending into the depressions and, by virtue of the convergence of the sides, resisting longitudinal displacement more firmly the greater the pull upon it, this thrusting together of the portion of the hose within the larger depression also tending to press the material in the circular depressions farther into them. As will be seen in Fig. 2 of the drawings, the outer surface of the hose within the sleeve assumes a ridged or V shape, which prevents its separation from the sleeve, and as this sleeve is in coaction, through its flange, with the coupling member the effect is to lock the outer surface to said member. Thus a double resistance is offered to separation. It will also be seen that on account of the longitudinal division or slot 20 extending throughout the length of the sleeve and the slots 20ª extending less than half-way in from the opposite ends the sleeve will be enabled to contract more at the ends than at the center. This will give the arched shape shown in Fig. 2 and provides a very efficient hold for the hose.

Having thus described my invention, I claim as new and desire to secure by Letters Patent—

1. In a coupling, the combination with a coupling-section having an annular depression and an inclined depression beyond said annular depression, of a divided threaded sleeve surrounding the inclined depression and being provided with a flange entering the annular depression, and oppositely-inclined nuts operating upon the sleeve.

2. In a coupling, the combination with a coupling-section having an annular depression and an inclined depression beyond said annular depression from which inclined depression open further separated depressions, of a divided threaded sleeve surrounding the inclined depression and being provided with a flange entering the annular depression, and oppositely-inclined nuts operating upon the sleeve.

In testimony whereof I have signed my name to this specification in the presence of two subscribing witnesses.

WILLIAM H. ALBEE.

Witnesses:
JNO. M. RITTER,
ALBERT E. FAY.